(12) United States Patent
Kannan

(10) Patent No.: US 11,831,207 B1
(45) Date of Patent: Nov. 28, 2023

(54) GENERATOR ROTOR ASSEMBLIES

(71) Applicant: Hamilton Sundstrand Corporation, Charlotte, NC (US)

(72) Inventor: Kanthi Gnanam Kannan, Katy, TX (US)

(73) Assignee: Hamilton Sundstrand Corporation, Charlotte, NC (US)

(*) Notice: Subject to any disclaimer, the term of this patent is extended or adjusted under 35 U.S.C. 154(b) by 0 days.

(21) Appl. No.: 17/740,818

(22) Filed: May 10, 2022

(51) Int. Cl.
*H02K 11/04* (2016.01)
*H02K 11/042* (2016.01)

(52) U.S. Cl.
CPC .................. *H02K 11/042* (2013.01)

(58) Field of Classification Search
CPC ...... H02K 11/00; H02K 11/04; H02K 11/042; H02K 5/00; H02K 5/02; H02K 5/08; H02K 5/24; H02K 9/00; H02K 9/22
See application file for complete search history.

(56) References Cited

U.S. PATENT DOCUMENTS

| | | | | |
|---|---|---|---|---|
| 3,688,137 A | * | 8/1972 | Filhol | H01B 3/002 310/43 |
| 4,570,094 A | | 2/1986 | Trommer | |
| 5,124,603 A | | 6/1992 | Hayward et al. | |
| 2006/0043805 A1 | * | 3/2006 | Bradfield | H02K 9/06 310/90 |
| 2010/0007231 A1 | * | 1/2010 | Imazawa | H02K 11/05 310/91 |

FOREIGN PATENT DOCUMENTS

| | | | |
|---|---|---|---|
| JP | H0338098 A | * | 2/1991 |
| KR | 101655203 B1 | * | 9/2016 |

* cited by examiner

Primary Examiner — Tran N Nguyen
(74) Attorney, Agent, or Firm — Locke Lord LLP; Joshua L. Jones; Daniel J. Fiorello

(57) ABSTRACT

A generator rotor assembly can include a diode holder configured to hold one or more diodes. The diode holder can be formed of a first material having a first coefficient of thermal expansion (CTE). The assembly can include a rotor housing configured to hold the diode holder within the rotor housing. The rotor housing can be formed of a second material having a second CTE. The second CTE is different than the first CTE. The assembly can include one or more CTE compensation spacers interfacing the diode holder to the rotor housing such that the diode holder and the rotor housing are connected via the one or more CTE compensation spacers. The one or more CTE compensation spacers can be configured to have a third CTE different than the first CTE and the second CTE to compensate for relative length change between the diode holder and the rotor housing to prevent and/or reduce temperature induced stress growth at the interface of the diode holder and the rotor housing.

18 Claims, 1 Drawing Sheet

GENERATOR ROTOR ASSEMBLIES

FIELD

This disclosure relates to generator rotor assemblies, e.g., for aircraft generators.

BACKGROUND

Rotating rectifier components are traditionally housed in a holder which is axially preloaded by set screws at room temperature. During operation, at high temperature, the preload increases significantly and can even dent (permanent deformation) the contact location on the diode holder (e.g., which can made of aluminum). Subsequently, when the generator is non-operational at room temperature, the originally applied preload reduces considerably.

Such conventional methods and systems have generally been considered satisfactory for their intended purpose. However, there is still a need in the art for improved generator rotor assemblies. The present disclosure provides a solution for this need.

SUMMARY

A generator rotor assembly can include a diode holder configured to hold one or more diodes. The diode holder can be formed of a first material having a first coefficient of thermal expansion (CTE). The assembly can include a rotor housing configured to hold the diode holder within the rotor housing. The rotor housing can be formed of a second material having a second CTE. The second CTE is different than the first CTE. The assembly can include one or more CTE compensation spacers interfacing the diode holder to the rotor housing such that the diode holder and the rotor housing are connected via the one or more CTE compensation spacers. The one or more CTE compensation spacers can be configured to have a third CTE different than the first CTE and the second CTE to compensate for relative length change between the diode holder and the rotor housing to prevent and/or reduce temperature induced stress growth at the interface of the diode holder and the rotor housing.

In certain embodiments, the CTE compensation spacer can include a negative CTE such that the CTE compensation spacer shrinks with increasing temperature. The diode holder can include one or more mount tabs extending therefrom. The one or more mount tabs can extend axially from the diode holder. Each CTE compensation spacer can be mounted to and/or trapped within (e.g., within a slot drilled into) a respective mount tab.

The one or more CTE compensation spacers can be configured to abut a threaded fastener. The assembly can include one or more threaded fasteners attaching the rotor housing to the one or more CTE compensation spacers, thereby connecting the rotor housing to the diode holder.

In certain embodiments, the diode holder can be made of aluminum. In certain embodiments, the rotor housing can be made of stainless steel. In certain embodiments, the one or more threaded fasteners can be made of the same material as the rotor housing. In certain embodiments, the diode housing can be axially fixed within the rotor housing.

In accordance with at least one aspect of this disclosure, a generator can include a generator rotor assembly. The generator rotor assembly can be or include any suitable embodiment of an assembly as disclosed herein, e.g., as described above.

In accordance with at least one aspect of this disclosure, a method can include interfacing a diode holder to a rotor housing using a negative CTE compensation spacer (e.g., made of ALLVAR) to reduce or eliminate temperature induced stress caused by relative growth between the diode holder and the rotor housing. In certain embodiments, the method can further include forming a hole in a mounting tab of the diode holder, trapping the negative CTE compensation spacer into the hole, and abutting a fastener attached to the rotor housing to the negative CTE compensation spacer.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
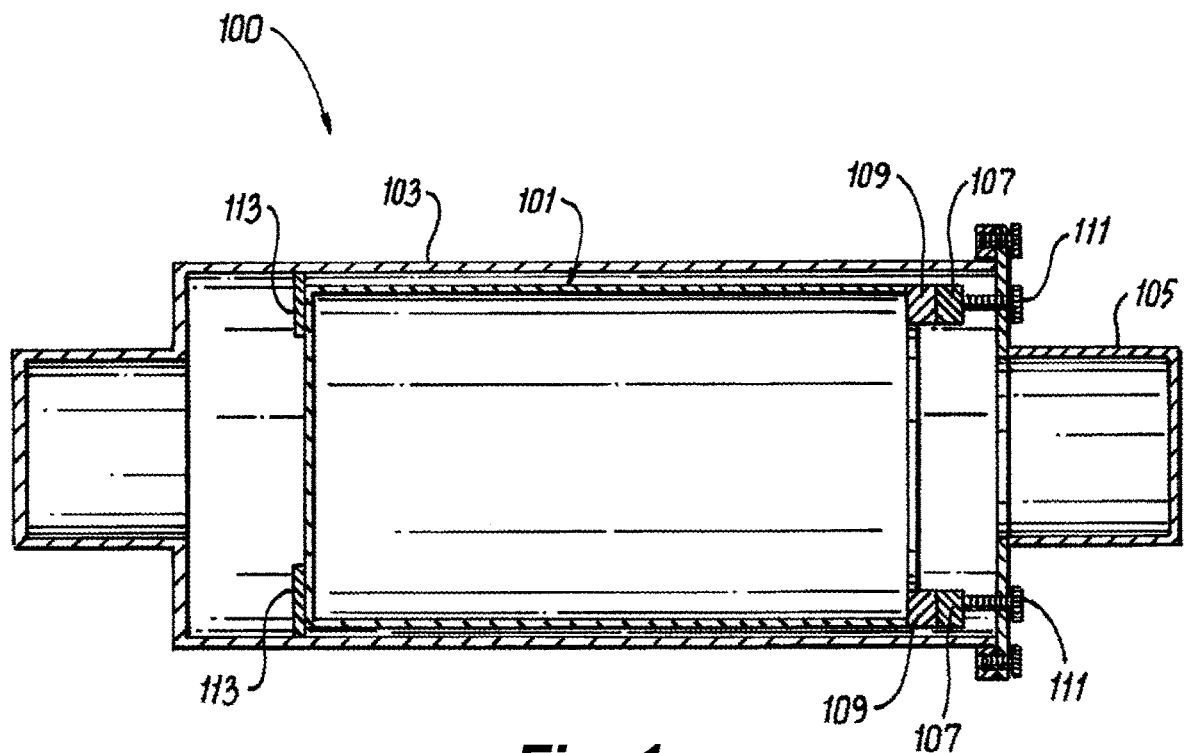
FIG. 1 is a cross-sectional view of an embodiment of an assembly in accordance with this disclosure.
Figure 2:
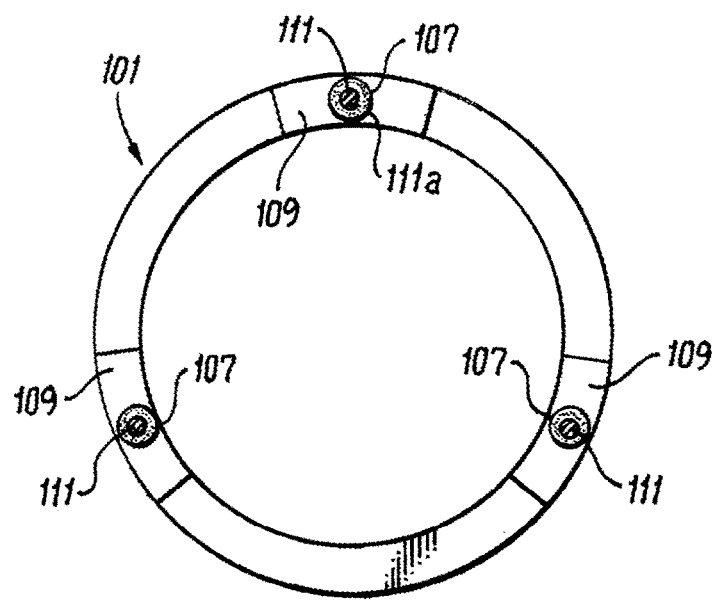
FIG. 2 is a plan view of an embodiment of a diode holder of the embodiment of FIG. 1.

Reference will now be made to the drawings wherein like reference numerals identify similar structural features or aspects of the subject disclosure. For purposes of explanation and illustration, and not limitation, an illustrative view of an embodiment of an assembly in accordance with the disclosure is shown in FIG. 1 and is designated generally by reference character 100. Other embodiments and/or aspects of this disclosure are shown in FIG. 2. Certain embodiments described herein can be used to reduce stress at the interface of a diode holder and rotor housing in a rotating diode rotor assembly a generator, for example.

In accordance with at least one aspect of this disclosure, referring to FIGS. 1 and 2, a generator rotor assembly 100 can include a diode holder 101 configured to hold one or more diodes (for a rotating diode assembly, not shown). The diode holder 101 can be formed of a first material having a first coefficient of thermal expansion (CTE).

The assembly 100 can include a rotor housing 103 (e.g., connected to and/or part of a rotor 105) configured to hold the diode holder 101 within the rotor housing 103 (e.g., enclosed therein or otherwise). The rotor housing 103 can be formed of a second material having a second CTE. The second CTE is different than the first CTE.

The assembly 100 can include one or more CTE compensation spacers 107 interfacing the diode holder 101 to the rotor housing 103 such that the diode holder 101 and the rotor housing 103 are connected via the one or more CTE compensation spacers 107. The one or more CTE compensation spacers 107 can be configured to have a third CTE different than the first CTE and the second CTE to compensate for relative length change between the diode holder 101 and the rotor housing 103 to prevent and/or reduce temperature induced stress growth at the interface (e.g., the connection point) of the diode holder 101 and the rotor housing 103.

In certain embodiments, the CTE compensation spacer 107 can include a negative CTE such that the CTE compensation spacer shrinks with increasing temperature. In this regard, if the first CTE and the second CTE are positive but different, the negative CTE compensation spacer 107 can become smaller to account for relative movement between the rotor housing 103 and the diode holder 101. It is contemplated that the CTE compensation spacer 107 can be a positive CTE and the first CTE and second CTE can be negative CTE to provide a similar effect.

The thickness of each CTE compensation spacer 107 can be selected to provide the change in shape needed to account for expansion of diode holder 101 relative to the rotor housing 103. Any suitable thickness and/or geometry to provide any suitable compensation for any suitable application is contemplated herein.

In certain embodiments, the diode holder 101 can include one or more mount tabs 109 (e.g., three symmetrically/evenly spaced arcuate sections as shown) extending therefrom. The one or more mount tabs 109 can extend axially from the diode holder 101 (e.g., as shown in FIG. 1). Each CTE compensation spacer 107 can be mounted (e.g., attached to) to and/or trapped within a respective mount tab 109. The spacer 107 can be held to the diode holder 101 and/or the tabs 109 thereof in any suitable manner (e.g., mechanically, with adhesive, via compression, etc.).

In certain embodiments, the mounting tabs 109 can define a hole 111a (e.g., drilled into the tabs 109) that can be configured to receive a CTE compensation spacer 107 and/or to allow access to an otherwise inserted CTE compensation spacer 107 for a fastener to attach to. In certain embodiments, the mounting tabs 109 can be configured such that the respective CTE compensation spacer 107 can be axially trapped within each mounting tab 109.

The one or more CTE compensation spacers 107 can be configured to abut a threaded fastener 111 (e.g., a screw). For example, the assembly 100 can include one or more threaded fasteners 111 disposed in the rotor housing 103 abutting the one or more CTE compensation spacers 107, thereby retaining the diode holder 101 within rotor housing 103 (e.g., using compression as shown). The one or more threaded fasteners 111 can be axially threaded through the rotor housing 103 to contact each CTE compensation spacer 107 held within each mount tab 109, e.g., as shown. While threaded fasteners 111 (e.g., set screws) are shown and described, any suitable fastener arrangement or other attachment between the diode holder 101 and the rotor housing 103 using the one or more CTE compensation spacers 107 to provide CTE compensation is contemplated herein. Any suitable structure utilizing a compensating CTE configured to reduce stress at the interface of two different structures is contemplated herein.

In certain embodiments, the diode holder 101 can be made of aluminum. In certain embodiments, the rotor housing 103 can be made of stainless steel. In certain embodiments, the one or more threaded fasteners 111 can be made of the same material as the rotor housing 103 (e.g., stainless steel).

In certain embodiments, the diode housing 101 can be axially fixed within the rotor housing 103. For example, as shown, the diode housing 101 can be axially stopped by backstops 113 in the rotor housing 103. The threaded fasteners 111 can ultimately press the diode holder 101 against the backstops 113 to axially fix the diode holder 101 within the rotor housing 103. The threaded fasteners 111 can be used to provide a preload to the diode housing 101. The one or more CTE compensation spacers 107 can thus prevent additional loading by shrinking between the threaded fastener 111 and the tabs 109. Any other suitable arrangement to fix the diode housing 101 axially is contemplated herein.

In accordance with at least one aspect of this disclosure, a generator (not shown) can include a generator rotor assembly. The generator rotor assembly can be or include any suitable embodiment of an assembly as disclosed herein, e.g., assembly 100 as described above.

In accordance with at least one aspect of this disclosure, a method can include interfacing a diode holder to a rotor housing using a negative CTE compensation spacer to reduce or eliminate temperature induced stress caused by relative growth between the diode holder and the rotor housing. In certain embodiments, the method can further include forming a hole in a mounting tab of the diode holder, trapping the negative CTE compensation spacer in the hole, and abutting a fastener attached to the rotor housing to the negative CTE compensation spacer.

In certain embodiments, e.g., where the fasteners and rotor are steel and the diode holder is aluminum, there will be a CTE mismatch and the aluminum would grow axially relative to the steel in use. Embodiments can include tabs machined in the diode holder. Set screws can be fixed to the rotor and made to contact the tabs, and the set screws can be adjusted to control the preload between the diode holder and the rotor housing (e.g., which acts on the tabs).

Embodiments can include one spacer per set screw that has negative CTE which can reduce net thermal expansion of the assembly. Certain embodiments can have a single spacer for all screws, or any other suitable number of spacers. In certain embodiments, each spacer can be bonded to the tabs and the steel screws can press against to each spacer.

Embodiments can include drilling a hole in each tab. The size of the hole, and thus the compensation spacer, may be limited by the inner diameter and the outer diameter of the diode holder. Each spacer can be inserted into a respective tab, then be bonded to the bottom face of the drilled hole in the tab. The thickness of each CTE compensation spacer can be selected to provide the change in length needed to account for expansion of diode holder relative to the rotor housing and/or set screws.

Embodiments can provide axial preload control using negative CTE compensation spacers in generator rotors, for example. As disclosed above, the coefficient of thermal expansion (CTE) of a diode holder which can be made of aluminum can be higher than that for the rotor and/or set screws that attach the rotor to the diode holder, and which can be made of steel. With increase in temperature, the expansion of the aluminum is larger than that for steel and hence can create a considerable increase in axial preload without compensation. By housing certain compensation spacers/pads of negative CTE (e.g., ALLVAR alloy) in the diode holder at the contact location, the extent of preload increase can be considerably reduced or eliminated. A desired pad thickness can be determined from the CTE differences of the materials involved and relevant length for thermal growth to produce reduced or eliminated preload increase.

Embodiments can provide a reduction in design preload due to thermal cycling which can instead be controlled and eliminated. Permanent deformation at the contact locations in diode holders can be eliminated.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A generator rotor assembly, comprising:
   a diode holder configured to hold one or more diodes, wherein the diode holder is formed of a first material having a first coefficient of thermal expansion (CTE);
   a rotor housing configured to hold the diode holder within the rotor housing, wherein the rotor housing is formed of a second material having a second CTE, wherein the second CTE is different than the first CTE; and
   one or more CTE compensation spacers interfacing the diode holder to the rotor housing such that the diode holder and the rotor housing are connected via the one or more CTE compensation spacers, wherein the one or more CTE compensation spacers are configured to have a third CTE different than the first CTE and the second CTE to compensate for relative length change between the diode holder and the rotor housing to prevent and/or reduce temperature induced stress growth at the interface of the diode holder and the rotor housing.

2. The assembly of claim 1, wherein the CTE compensation spacer includes a negative CTE such that the CTE compensation spacer shrinks with increasing temperature.

3. The assembly of claim 2, wherein the diode holder includes one or more mount tabs extending therefrom.

4. The assembly of claim 3, wherein the one or more mount tabs extend axially from the diode holder.

5. The assembly of claim 4, wherein each CTE compensation spacer is mounted to and/or trapped within a respective mount tab.

6. The assembly of claim 5, wherein the one or more CTE compensation spacers are configured to abut a threaded fastener.

7. The assembly of claim 6, further comprising one or more threaded fasteners attaching the rotor housing to the one or more CTE compensation spacers, thereby connecting the rotor housing to the diode holder.

8. The assembly of claim 7, wherein the diode holder is made of aluminum.

9. The assembly of claim 8, wherein the rotor housing is made of stainless steel, wherein the one or more threaded fasteners are made of the same material type as the rotor housing.

10. The assembly of claim 9, wherein the diode housing is axially fixed within the rotor housing.

11. A generator, comprising:
    a generator rotor assembly, comprising:
      a diode holder configured to hold one or more diodes, wherein the diode holder is formed of a first material having a first coefficient of thermal expansion (CTE);
      a rotor housing configured to hold the diode holder and formed of a second material having a second CTE, wherein the second CTE is different than the first CTE; and
      one or more CTE compensation spacers interfacing the diode holder to the rotor housing such that the diode holder and the rotor housing are connected via the one or more CTE compensation spacers, wherein the one or more CTE compensation spacers are configured to have a third CTE different than the first CTE and the second CTE to compensate for relative length change between the diode holder and the rotor housing to prevent and/or reduce temperature induced stress growth at the interface of the diode holder and the rotor housing.

12. The generator of claim 11, wherein the CTE compensation spacer includes a negative CTE such that the CTE compensation spacer shrinks with increasing temperature.

13. The generator of claim 12, wherein the diode holder includes one or more mount tabs extending therefrom.

14. The generator of claim 13, wherein the one or more mount tabs extend axially from the diode holder.

15. The generator of claim 14, wherein each CTE compensation spacer is mounted to and/or trapped within a respective mount tab.

16. The generator of claim 15, wherein the one or more CTE compensation spacers are configured to abut a threaded fastener.

17. The generator of claim 16, further comprising one or more threaded fasteners attaching the rotor housing to the one or more CTE compensation spacers, thereby connecting the rotor housing to the diode holder.

18. The generator of claim 17, wherein the diode holder is made of aluminum.

* * * * *